United States Patent Office 3,338,691
Patented Aug. 29, 1967

3,338,691
HEATING COMPOSITION
Edwin C. Knowles, Poughkeepsie, and Frederic C. McCoy, Beacon, N.Y., assignors to Texaco Inc., New York, N.Y., a corporation of Delaware
No Drawing. Filed Mar. 23, 1966, Ser. No. 536,635
20 Claims. (Cl. 44—40)

This application is a continuation-in-part application of application Ser. No. 383,933, filed July 20, 1964, now abandoned.

The present invention relates to novel heating compositions, methods of making the novel compositions, and methods of using such compositions. More particularly, the present invention is directed to novel heating compositions for lighting camp fires, signal fires, cooking and heating fires in stoves and fireplaces, both indoors and outdoors, and also for igniting trash or rubbish piles and for the protection of growing crops and plants during intermittent and/or extended periods of cold weather.

Heretofore, fires have been started or lit in various ways, for example, by first lighting kindling wood or other readily combustible materials such as paper, rags or relatively low boiling hydrocarbonaceous compositions added to the fire bed which contains a more difficult combustible material that will be the ultimate source of heat or light, such as coal, or logs or mixtures thereof. Such known methods possess inherent disadvantages that tend to make them objectionable for various reasons. For example, the use of paper alone or in combination with kindling wood to start a fire suffers from the disadvantage that the paper after being lighted can be relatively easily extinguished by the elements such as the wind or rain or combinations thereof before the more difficult combustible material is ignited and burning. Moreover, in modern times, particularly in the cities and suburbs, ready accessibility to a source of kindling wood is not as easy as it was heretofore. In addition, there is the inconvenience, accompanied by a certain amount of hazard, in cutting up kindling wood to suitable sizes.

The application of readily combustible liquids such as kerosene or aromatic distillates, sometimes in the form of aerosol gels or foams, as a means of improving the ignitibility of firewood is also commonly practiced. Regardless of the care exercised in using this type of igniter a definite hazard exists. Furthermore, the storage of such liquids, gels, or foams around the home involves a definite risk.

Another fire starting device now on the market comprises a package containing a number of cylinders of wax surrounded on the sides by cardboard covers. The cardboard is lighted and the cylinder placed in a shallow round pan containing a round asbestos wick. The wax melts, flows into the pan and is taken up and burned on the wick. This device works satisfactorily provided it is not tipped during operation, in which case the molten wax can spill. Furthermore, it depends for its operation on the pan and wick, which must be recovered from the fire, cooled and retained for reuse. If the pan or wick are misplaced or lost, the remaining wax cylinders are virtually useless.

Many methods have been proposed to provide protection to growing crops, and/or plants against cold weather damage. These known methods generally provided for the burning of a liquid fuel such as diesel or fuel oil, or a gaseous fuel such as natural gas or liquified petroleum gas (LPG) in the growing area or orchard during periods of actual or anticipated cold weather. Distribution of the heat produced by the burning fuel throughout the growing area frequently was accomplished by machine driven blowers or fans or by a pipe line distribution system in contact with or buried just below the surface of the earth and provided with suitable risers above ground to heat the area surrounding the crop or orchard.

Such liquid fuel systems are objectionable because of the fire danger of spilled fuel. Another disadvantage is that the spilled liquid fuel is harmful to the tree root system. Underground and surface pipe line distribution systems are not satisfactory because mechanical and cultivating equipment cannot be easily moved throughout a growing area having a pipe line system. Moreover, such systems are costly to install and maintain. Another known method of providing heat to the growing area, especially in orchards comprises individual stack type liquid fuel burners. This method avoids the objections of the pipe line heat system but it too is not completely satisfactory. Such fuel burners do not provide a uniform amount of heat to the growing area, particularly in an orchard wherein the lower portion of the tree is likely to receive too much heat therefrom while too little heat is provided for the upper portion of the tree.

Smudge pots have also been used but they are not satisfactory because of the large number of units required for a given area, the large fuel consumption thereof, and the relatively small temperature increase produced thereby. In addition, these devices are not effective except at relatively low heights, thus severely limiting their use in orchards.

It has been found that the above disadvantages of the present method of starting fires and protecting crops and plants from cold weather damage can be overcome or materially decreased by the use of the novel heating compositions of the present invention. The heating composition of the present invention broadly is a wax composition of any convenient size or shape having a minor amount of a buoyant particulate material, as hereinafter more fully defined, in contact threwith.

More specifically, the present invention is directed to a heating composition comprising a wax component and a buoyant particulate material component, the buoyant particulate material component being present with the wax in an amount sufficient to increase the burning rate of the wax component.

As used in the specification and claims, the term "buoyant particulate material" refers to a particulate substance containing sufficient entrapped air not readily displaceable therefrom to permit it to float at or near the surface of molten wax. In brief, the material must have a bulk density less than that of the particular molten wax component used in the composition.

The heating composition of the present invention comprises a wax component in an amount of from about 90 to 99.9 percent and the particulate material component in an amount of from about 0.1 to about 10 percent by weight, based on the weight of the composition.

In the embodiment of the present invention to protect crops and plants against cold weather, the composition of wax and buoyant material is provided with a fire resistant outer covering or envelope having certain characteristics hereinafter more fully described.

The advantages of the heating composition of the present invention will become apparent in the light of the accompanying detailed disclosure.

It is to be noted that the principal points of superiority of the compositions of the present invention over current practice are: (a) compactness and convenience—the wax-buoyant particulate material compositions provide a large amount of heat energy in a readily storable, easily transportable form; (b) safety—these compositions are non-explosive, non-volatile, leak proof and cannot be accidentally ignited; (c) waterproofness—these compositions can be soaked or immersed in water and still burn readily after shaking or blotting off the adhering moisture; (d) these compositions are self-contained and do not require any supplementary pans or wicks; (e) the wax-buoyant mix can be readily cast or molded into desired shape of whatever size is required; and, (f) these compositions avoid the potential harm to plant root systems associated with liquid fuels.

One of the novel features of the heating composition of the present invention is its ability to spread the flame from the point of ignition over the entire exposed surface of the composition. This novel feature is attributable to the buoyant particulate material component in co-operation with the wax component. This novel spreading power produces an increased amount of light and heat in comparison with wax of similar size and shape without the buoyant particulate material component.

When used as a fire igniter, the ability of the composition to spread the flame from the point or place of ignition over the entire exposed surface of the composition causes the more difficult combustible materials disposed in the fire bed in and about the composition of the present invention to be ignited much more rapidly and begin to burn sooner. Thus, the resulting ignited, less readily combustible materials are not as likely to become extinguished by external forces such as wind and/or rain. Consequently, the ignited fire bed is more likely to continue burning.

When used to protect growing crops and plants against cold weather damage, this spreading ability also provides a ready means of igniting the top surface of the wax in the container and release of a relatively large amount of heat therefrom in a short time.

When used to protect growing crops and/or plants against cold weather damage, the heating composition is provided with an outer container or envelope having a relatively slower burning rate than the burning rate of the composition (a) to prevent the liquid wax formed during the burning period from flowing down the sides of the shaped composition and away from the composition; and (b) to permit substantially unrestricted access of air to the burning surface throughout the burning period thus helping to provide a relatively uniform rate of burning for the composition.

Suitable containers for the composition can be prepared in a manner well known in the art of container manufacture from paper stock, cardboard, fiber board and the like. More specifically, it has been found that suitable containers include corrugated paper or seamless cardboard containers that may be externally covered with a light gauge metal foil (e.g. aluminum) or externally coated with a fire resistant coating such as a sodium silicate or an ammonium dihydrogen phosphate or a fire resistant paint. These coatings may be applied to the container by spraying, dipping, painting or a combination of such methods.

In general the thickness of the metal foil around the outside of the container can vary from about 0.0002 to about 0.005 inch. A metal foil thinner than about 0.0002 inch or thicker than about 0.005 inch is not satisfactory for a heating composition designed to provide adequate protection to crops and plants against cold weather damage. Use of a thinner foil is likely to result in collapse of the container sidewalls during the burning period. A thicker foil will adversely retard the burning rate of the composition since the container walls will not be consumed during ignition at a rate sufficiently rapid to permit substantially free access of air to the burning surface.

A particularly preferred container is a cylindrical open top kraft seamless convolute container with a wall thickness between about 0.01 and 0.108 inch having a 0.00035 inch aluminum foil coating on the outside thereof, and a metal bottom. The side walls of such a container burn at a rate slightly less than the burning rate of the composition and are consumed during ignition.

It has been found that untreated (non-chemically fire resistant) containers or non-metallic foil covered containers as well as metallic containers (e.g. of the tin can type) are not satisfactory containers for use in the present invention. The non-fire resistant or non-metal foil containers burn too rapidly. The metal containers provide erratic burning rates due to restricted air supply during the latter stages of burning.

The particular size and/or shape of the heating composition of the present invention is somewhat dependent on the particular end use and the method of manufacture. For example if the heating composition is to be used as an igniter to start a fire in an outdoor grill or fireplace containing a combustible material, such as wood, charcoal briquettes, coal and the like, including mixtures thereof, then the fire starting composition is preferably shaped to expose a maximum surface area to the atmosphere, thus permitting fairly rapid combustion of the igniter when lit. Preferred shapes for fire starting are a square or rectangular tablet or pellet since these configurations expose a greater surface area to the atmosphere.

The heating composition also can be shaped in the form of a relatively flat, thin wafer or tablet or elongated as a candle when used for starting a relatively small fire. The heating composition and the container therefore to protect growing crops and plants also may be of any convenient size and/or shape. In general it has been found that a substantially cylindrical or rectangular shape is the most convenient and satisfactory in most instances. The size is determined to a large extent by the heat evolution and burning time desired, i.e. the longer the desired burning time, the greater the depth and the greater the heat evolution, the larger the surface area. Alternatively, one can employ one or more of the smaller sized compositions, igniting them at spaced intervals of time to accomplish substantially the same results as with the more bulky composition. It has been found that rectangular shaped containers measuring about 8 by 8 by 8 inches and filled nearly to the top thereof with the composition of the invention including a petroleum wax of about 150° F. melting point will burn on an average of about 8-10 hours.

The wax component of the composition of the present invention can be a natural animal or mineral wax, a petroleum wax, or a synthetic wax as well as mixtures of any of the above types of wax.

The term "wax" in the specification and claims is employed in a generic sense to define both natural waxes, synthetic waxes and substances chemically similar to waxes, substitutes and wax equivalents. Among such substances are the hydrocarbon waxes including ceresin, ozocerite, and microcrystalline types such as wax tailings, mineral beeswax, and the like, vegetable waxes such as carnauba, montan and others, and animal waxes such as stearin, stearic acid, beeswax, tallow, spermaceti and the like. Also, synthetic waxes such as hydrogenated montan wax and high alcohols.

The preferred wax component is a petroleum wax and may be paraffin or a microcrystalline wax or a mixture thereof. Such waxes are normally solid at room temperature and are composed mainly of long chain aliphatic hydrocarbons.

The paraffin wax can be a crude slack wax that may be partially refined, a scale wax, a refined wax or a mixture of such waxes. The microcrystalline wax can be a tank bottoms wax, residual microcrystalline wax or a mixture of such waxes. Typical physical properties for a suitable paraffin wax include a melting point temperature of 150° F. and an oil content of about 15%.

Desirably, the melting point temperature of the wax used in the present invention should be between about 100° and 200° F., preferably about 120° to 180°, to achieve fairly rapid melting of the wax and assist in spreading the flame from the point of ignition to the adjacent exposed surfaces. While waxes having a melting point temperature of less than 100° F. and greater than 200° F. can be used, such waxes do not perform as well as the 120° to 180° F. melting point temperature waxes in the composition of the present invention.

Representative buoyant particulate materials that perform satisfactorily in the heating composition of the present invention include expanded vermiculite, shredded cork, perlite, pumice and mixtures of perlite with vermiculite or cork pumice. Another satisfactory buoyant particulate material is a plurality of hollow glass spheres having a typical average diameter of about 100 microns (.04 inch) sold under the trade name "Microballoons" by Sohio Chemical Company. A particularly preferred buoyant material is perlite (volcanic glass), especially the expanded form. Perlite provides a superior wicking action. Perlite is more fully described in "Encyclopedia of Science and Technology," McGraw Hill, vol. 10, 1960, at page 21. Ground cork particles are adaptable for the covered compositions of the invention because the burning composition can be easily extinguished by pushing the cork particles below the upper surface of the liquid wax. When released, the buoyant particles bob up to the top level of the liquid wax and are readily usable again when the composition is reignited. Expanded rice, corn, wheat and oat grain cereals are unsatisfactory buoyant particulate materials in the composition of the invention as well as other buoyant materials such as buckwheat hulls, pine wood charcoal and granulated balsa wood.

Broadly the composition comprises from about 90 to 99.9 percent by weight of wax and 0.1 to 10 percent by weight of buoyant particulate material. A preferred range is from 97 to 99 percent wax and 1 to 3 percent when the buoyant paticulate material is cork, vermiculite or pumice since this range shows the most satisfactory uniform burning rate for these materials.

A preferred range for the perlite and micro-balloons species as well as mixtures of perlite with the other satisfactory materials is about 0.1 to about 5% by weight, the balance comprising wax.

The particle size of the buoyant particulate material should be in the range of from about 0.005 to 1.0 inch with a range between about 0.01 and 0.3 inch being preferred. The particularly preferred particle size range for perlite is from about 0.01 to 0.1 inch. The preferred range permits uniform spreading of the flame from the point of ignition to the remaining exposed surfaces while providing sufficiently small particles for ease of compounding.

The heating composition of the invention in the container can be prepared for use in several ways. For example, the container can be substantially filled with the hot wax material, and during cooling the buoyant particulate material can be added thereto so as to concentrate the buoyant material in or near the exposed end portion of the wax. Preferably, the buoyant particulate material is placed in the empty container, then the wax added and allowed to cool.

The composition of the invention can be ignited in a known manner such as, for example, by use of a match, a blow torch, and the like. It has been found that the covered heating composition can be readily ignited by pouring into the container a small amount of a volatile, flammable fuel such as a 50/50 mixture of isooctane and kerosene and applying a lighted match or taper thereto.

Following is a description by way of example of methods carrying out the practice of the present invention.

*Example 1*

A one gallon motor oil can "RC Foil Kan" container measuring 6.5 inches in diameter and 7.75 inches high, externally covered with 0.00035 inch thick aluminum foil, was charged with 40 parts of expanded vermiculite. The vermiculite was composed of the following sized particles, 43% smaller than 0.265 inch but larger than 0.079 inch; 54% smaller than 0.079 inch but larger than 0.016 inch; 3% smaller than 0.016 inch. There was added to the container 2940 parts by weight of petroleum wax C (average melting point temperature of about 150° F.) that had been previously heated to 170° F. During addition of the hot wax, the vermiculite floated to the top thereof. When the wax had cooled to room temperature the vermiculite formed a substantially continuous top layer or crust on the wax. The container was placed outdoors, 20 ml. of a 50/50 mixture of isooctane and kerosene was poured on top of the vermiculite, and ignited with a blow torch. The container burned at a satisfactory rate for about 7 hours. During the burning period the vermiculite remained floating in the liquid wax.

*Example 2*

A RC Foil Kan container, similar to the one described in Example 1, except that it was only 4 inches high, was charged with 20 parts of ground cork. The cork particles were smaller than 0.07 inch and larger than 0.016 inch. There was added about 1500 parts by weight of hot petroleum wax C. The cork particles floated to the top of the added liquid wax and formed a crust like layer thereon when the wax cooled to room temperature. The container was placed outdoors and ignited in the manner described in Example 1, using the isooctane/kerosene mixture and the blow torch. The flame spread over the exposed surface readily and the container burned at a satisfactory rate.

*Example 3*

Expanded vermiculite in an amount of 90 parts by weight was charged to a corrugated paper box measuring 6.75 by 8 by 6.75 inches high that had been externally covered with 0.0007 inch thick aluminum foil. The vermiculite particles were of the same size distribution as the particles of Example 1. Hot (170° F.) petroleum wax C in an amount of 4260 parts by weight was poured into the container causing the vermiculite to rise to the top of the wax. After the wax had solidified, 20 ml. of a 50/50 isooctane/kerosene mixture was poured into the container and ignited. The container burned satisfactorily for 6 hours, when it was arbitrarily extinguished.

*Example 4*

There was charged to a cylindrical paper container measuring 8 inches in diameter and 6.5 inches in height, externally covered with 0.00035 inch thick aluminum foil, 100 parts of expanded vermiculite. The particles had the following average size: 33% were larger than 0.26 inch and 67% were smaller than 0.26 inch but larger than 0.18 inch. There was added to the container 3435 parts by weight of a 50/50 blend of hot petroleum wax C and wax B, the latter having an average melting point temperature of about 132° F. During addition of the wax, the vermiculite floated to the top of the liquid wax. After the wax had cooled to room temperature 20 ml. of the isooctane/kerosene mixture was poured on the vermiculite and the container was ignited. The container burned at a satisfactory rate for 7 hours.

*Example 5*

Into a six-ounce container there was added 2 parts by weight of hollow glass spheres having an average diameter of about 100 microns sold under the trade name "Microballoons" and there was then added 100 parts of a wax mixture comprising a 50/50 blend of petroleum wax C and B that had been previously heated to 180° F. Addition of the hot wax to the container caused the balloons to float on the surface of the hot wax. A layer of the glass balloons formed on the wax surface on cooling of the wax. Approximately 3 ml. of a 50/50 mixture of gasoline and furnace oil starting fluid were added to the container and then the fluid was ignited by a lit match. The composition burned at a satisfactory rate. During the burning period the microballoons remained floating in the liquid wax.

Example 6

An eight inch diameter by 9.875 inch seamless cylindrical convolute cardboard container having a metal bottom was dipped into an aqueous solution of sodium silicate to coat the external portions thereof, removed from the solution and allowed to dry. There was charged to the resulting treated container 0.17 pound of dried perlite IN–8 grade (41.6% being retained on a sieve having 0.0234 inch openings, 30.8% being retained on a sieve having 0.0117 inch openings, 19.6% being retained on a sieve having 0.0059 inch openings, and 8% passing through the sieve with 0.0059 inch openings), and then there was charged 13.22 pounds of a hot wax mixture comprising a 50/50 blend of petroleum wax C and wax B that had been previously heated to about 170° F. with stirring. Stirring was continued until all of the wax had been added to the container. During the wax addition the perlite particles floated on the exposed surface of the hot wax. After filling, the container was allowed to cool to room temperature and the wax solidified. A 15 ml. portion of a starting fluid comprising a 50/50 mixture of gasoline and diesel fuel was poured on the perlite and the starter fluid was ignited. The container contents burned at a satisfactory rate for about four hours before being arbitrarily extinguished.

Obviously, many modifications and variations of the invention as hereinbefore set forth may be made without departing from the spirit and scope thereof, and therefore only such limitations should be imposed as are indicated in the appended claims.

We claim:
1. A heating composition consisting essentially of 90 to 99.9% by weight of a wax component containing from 0.1 to 10% by weight of a buoyant particulate material component in contact with said wax to increase the burning rate of said composition, said buoyant material being selected from the group consisting of expanded vermiculite, shredded cork, perlite, pumice, hollow glass spheres having an average diameter of about 100 microns, perlite-vermiculite, perlite-cork and perlite-pumice mixtures.

2. A composition as claimed in claim 1 wherein the buoyant particulate material has an average particle size between about 0.005 and 1.0 inch.

3. A composition as claimed in claim 1 wherein said wax component is a refined petroleum wax having a melting point temperature range of from about 100° to 200° F.

4. A composition as claimed in claim 1 wherein said buoyant particulate material component comprises expanded vermiculite having an average size between 0.07 and 0.3 inch.

5. A composition as claimed in claim 1 wherein said buoyant particulate material component comprises ground cork having an average particle size between 0.07 and 0.3 inch.

6. A composition as claimed in claim 1 wherein said buoyant particulate material component comprises expanded perlite having an average particle size between 0.005 and 0.1 inch.

7. A composition as claimed in claim 1 wherein the wax component comprises from about 95 to 99.9% and the buoyant particulate material component comprises from about 0.1 to 5% based on the weight of the composition.

8. A composition as claimed in claim 1 additionally containing an ignitible wick disposed in said wax component having an end portion accessible for ignition.

9. An article of manufacture comprising a fire resistant container having an open end, a heating composition substantially filling said container, said composition consisting essentially of from 90 to 99.9% by weight of a wax component and from 0.1 to 10% by weight of a buoyant particulate material component in contact with the wax component, said buoyant particulate material being present in the container to increase the burning rate of said wax, said buoyant material being selected from the group consisting of expanded vermiculite, shredded cork, perlite, pumice, hollow glass spheres having an average diameter of about 100 microns, perlite-vermiculite, perlite-cork and perlite-pumice mixtures.

10. An article of manufacture as claimed in claim 9 wherein the amount of wax component in said container is from about 95 to about 99.9 percent by weight and the amount of buoyant particulate material component in said container is from about 0.1 to about 5 percent by weight.

11. An article of manufacture as claimed in claim 9 wherein the buoyant particulate material component is partially embedded in that portion of the wax component adjacent the open end of the container.

12. An article of manufacture as claimed in claim 9 wherein the buoyant particulate material component, on ignition and melting of the upper portion of the wax component, becomes partially immersed in the burning wax.

13. An article of manufacture as claimed in claim 9 wherein said buoyant particulate material component comprises expanded vermiculite having an average particle size in the range of from about 0.07 to about 0.3 inch.

14. An article of manufacture as claimed in claim 9 wherein said buoyant particulate material component comprises ground cork having an average particle size between 0.07 and 0.3 inch.

15. An article of manufacture as claimed in claim 9 wherein said buoyant particulate material component comprises expanded perlite having an average particle size between about 0.005 and 0.1 inch.

16. An article of manufacture comprising a cylindrical fire resistant paper container having an open end and a closed end, a heating composition substantially filling said container, said composition consisting essentially of from 90 to 99.9% by weight of a petroleum wax and from 0.1 to 10% by weight of a buoyant particulate material in contact with said petroleum wax and present in said container to increase the burning rate of said petroleum wax, said buoyant material being selected from the group consisting of expanded vermiculite, shredded cork, perlite, pumice, hollow glass spheres having an average diameter of about 100 microns, perlite-vermiculite, perlite-cork, perlite-pumice mixtures.

17. An article of manufacture as claimed in claim 16 wherein said container comprises a paper container externally covered with an aluminum foil having a thickness in the range of from 0.0002 to 0.005 inch.

18. An article of manufacture as claimed in claim 16 wherein said container is a seamless convolute kraft paper container externally coated with sodium silicate.

19. An article of manufacture comprising a seamless cylindrical convolute cardboard container externally covered with an aluminum foil having a thickness between 0.00035 and 0.0015 inch, said container having an open and a closed end, said container being substantially filled with a composition consisting essentially of from 97 to 99 percent by weight of petroleum wax and from 1 to 3 percent by weight of ground cork having an average particle size in the range from about 0.07 to about 0.3 inch, said ground cork being in contact with said wax and present in said container to increase the burning rate of said wax.

20. An article of manufacture comprising a seamless cylindrical convolute cardboard container externally covered with an aluminum foil having a thickness between 0.00035 and 0.0015 inch, said container having an open and a closed end, said container being substantially filled with a composition consisting essentially of from 95 to 99.9 percent by weight of petroleum wax and from 0.1 to 5 percent by weight of expanded perlite, said perlite being in contact with said wax and present in said container to increase the burning rate of said wax.

References Cited

UNITED STATES PATENTS

| | | | |
|---|---|---|---|
| 117,757 | 8/1871 | Finley et al. | 44—34 |
| 664,246 | 12/1900 | Ellis | 44—7.5 |
| 2,622,017 | 12/1952 | Bramhall et al. | 44—40 |
| 2,734,365 | 2/1956 | Ferris et al. | 44—7.5 |

FOREIGN PATENTS

| | | |
|---|---|---|
| 27,654 | 9/1887 | Canada. |
| 10,371 | 9/1887 | Great Britain. |
| 411 | 4/1889 | Great Britain. |
| 263,708 | 1/1927 | Great Britain. |

DANIEL E. WYMAN, *Primary Examiner.*

C. F. DEES, *Assistant Examiner.*